(12) United States Patent
Janssen

(10) Patent No.: US 11,681,110 B2
(45) Date of Patent: Jun. 20, 2023

(54) APPARATUS FOR MONITORING THE OUTPUT OF AN OPTICAL SYSTEM

(71) Applicant: Lumentum Technology UK Limited, Towcester (GB)

(72) Inventor: Adrian Perrin Janssen, Devon (GB)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 17/449,695

(22) Filed: Oct. 1, 2021

(65) Prior Publication Data

US 2022/0113481 A1  Apr. 14, 2022

Related U.S. Application Data

(62) Division of application No. 16/474,982, filed as application No. PCT/GB2018/051830 on Jun. 29, 2018, now Pat. No. 11,137,556.

(30) Foreign Application Priority Data

Jun. 30, 2017 (GB) ...................................... 1710522

(51) Int. Cl.
*G02B 6/42* (2006.01)
*G01B 9/02* (2022.01)
(52) U.S. Cl.
CPC ....... *G02B 6/4214* (2013.01); *G01B 9/02051* (2013.01); *G02B 6/421* (2013.01)
(58) Field of Classification Search
CPC ................................................ G01B 9/02051
See application file for complete search history.

(56) References Cited

U.S. PATENT DOCUMENTS 4,284,449 A   8/1981 Stone
4,351,585 A   9/1982 Winzer et al.
(Continued)

FOREIGN PATENT DOCUMENTS

CH        651939 A5    10/1985
CN       1484774 A      3/2004
JP      2002196192 A    7/2002

OTHER PUBLICATIONS

International Search Report and Written Opinion for Application No. PCT/GB2018/051830, dated Dec. 4, 2018, 21 pages . . . .
(Continued)

*Primary Examiner* — Rhonda S Peace
(74) *Attorney, Agent, or Firm* — Harrity & Harrity, LLP

(57) ABSTRACT

Apparatus for monitoring the output of an optical system. The apparatus comprises first and second fibre optic sections, a reflective coating, and a detector. The first fibre optic section has a first cladding and a first core, and is configured to receive light from the optical system at one end and has at the other end a first angled, polished face. The second fibre optic section has a second cladding and a second core, and has at one end a second angled, polished face. The first and second fibre optic sections are arranged such that the first and second angled, polished faces are substantially parallel and adjacent and the first and second cores are substantially aligned. The reflective coating is applied to the first or second angled, polished face, and is configured to reflect a portion of light transmitted through the first core. The detector is arranged to receive the reflected light.

20 Claims, 3 Drawing Sheets

(56) References Cited

U.S. PATENT DOCUMENTS

| | | | |
|---|---|---|---|
| 4,371,233 A | 2/1983 | Masuda | |
| 4,778,237 A | 10/1988 | Sorin et al. | |
| 4,923,273 A | 5/1990 | Taylor | |
| 5,490,227 A | 2/1996 | Tanabe et al. | |
| 5,581,649 A | 12/1996 | Paquette et al. | |
| 6,081,637 A | 6/2000 | Rekow | |
| 6,236,793 B1 | 5/2001 | Lawrence et al. | |
| 6,254,282 B1 | 7/2001 | Ishihara et al. | |
| 6,614,963 B2 | 9/2003 | Melchior et al. | |
| 6,850,674 B2 | 2/2005 | Haraguchi et al. | |
| 6,868,222 B2 | 3/2005 | DePue et al. | |
| 6,892,009 B2 | 5/2005 | Ito et al. | |
| 6,983,096 B2 | 1/2006 | Pacheco et al. | |
| 7,024,079 B2 | 4/2006 | Komiya et al. | |
| 7,123,798 B2 | 10/2006 | Fukuyama et al. | |
| 7,195,402 B2 | 3/2007 | Fukuyama et al. | |
| 7,267,494 B2 * | 9/2007 | Deng | G02B 6/421 385/27 |
| 7,349,596 B2 | 3/2008 | Anderegg et al. | |
| 7,373,051 B2 | 5/2008 | Ide et al. | |
| 7,421,157 B2 | 9/2008 | Ide et al. | |
| 7,684,667 B2 | 3/2010 | Kim et al. | |
| 8,027,555 B1 | 9/2011 | Kliner et al. | |
| 9,782,063 B2 * | 10/2017 | Bacher | G02B 6/0006 |
| 10,416,401 B2 | 9/2019 | Lee | |
| 11,137,556 B2 | 10/2021 | Janssen | |
| 2002/0067879 A1 | 6/2002 | Fouquet et al. | |
| 2003/0044119 A1 | 3/2003 | Sasaki et al. | |
| 2003/0174962 A1 | 9/2003 | Poole et al. | |
| 2003/0228118 A1 | 12/2003 | Arbore | |
| 2004/0022494 A1 | 2/2004 | Liddle et al. | |
| 2004/0022495 A1 * | 2/2004 | Shapiro | G02B 6/4212 385/48 |
| 2004/0202424 A1 | 10/2004 | Cournoyer et al. | |
| 2005/0117831 A1 | 6/2005 | Komiya et al. | |
| 2006/0171631 A1 | 8/2006 | Deng et al. | |
| 2006/0188211 A1 | 8/2006 | Iwase et al. | |
| 2006/0239605 A1 | 10/2006 | Palen et al. | |
| 2008/0069497 A1 | 3/2008 | Tissot et al. | |
| 2009/0202201 A1 | 8/2009 | Scofet et al. | |
| 2009/0226138 A1 | 9/2009 | Kelly et al. | |
| 2014/0321861 A1 | 10/2014 | Ota et al. | |
| 2014/0363125 A1 | 12/2014 | Schwarzenbach et al. | |
| 2016/0103261 A1 | 4/2016 | Bauco et al. | |
| 2016/0109699 A1 | 4/2016 | Margallo Balbas et al. | |
| 2016/0166139 A1 | 6/2016 | Bacher et al. | |

OTHER PUBLICATIONS

Pi101 et al.,"Corning's OptiFocus Lensed Fiber Selected by Aegis Semiconductor," Business Wire, Nov. 1, 2004,1 page. XP055526720.
Wu, G., et al.,"Design and Use of Compact Lensed Fibers for Low Cost Packaging of Optical MEMS Components", Journal of Micromechanics & Microengineering, Institute of Physics Publishing, Bristol, Great Britain, Oct. 2004, vol. 14 (10), pp. 1367-1375. XP020069554.

* cited by examiner

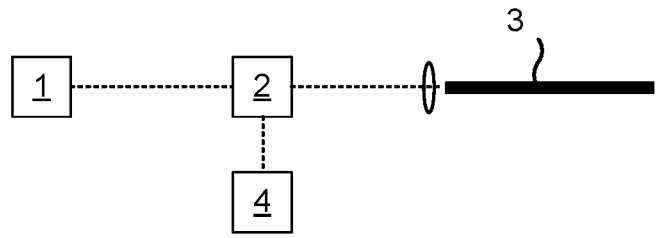
Figure 1 – Prior Art
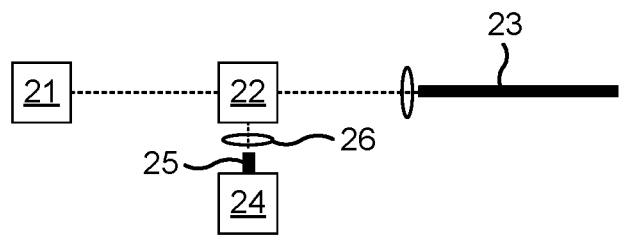
Figure 2
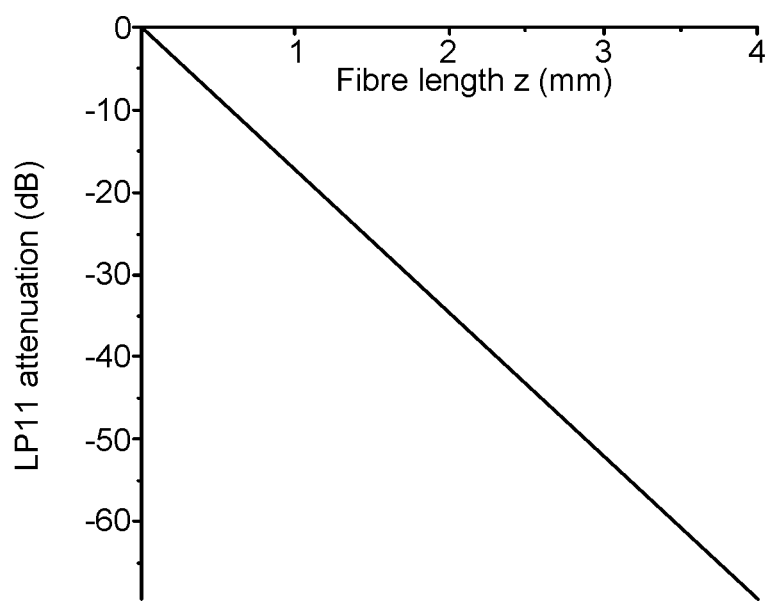
Figure 3

APPARATUS FOR MONITORING THE OUTPUT OF AN OPTICAL SYSTEM

RELATED APPLICATIONS

This application is a divisional of U.S. application Ser. No. 16/474,982, filed on Jun. 28, 2019 (now U.S. Pat. No. 11,137,556), entitled "APPARATUS FOR MONITORING THE OUTPUT OF AN OPTICAL SYSTEM AND TO ACCOUNT FOR ATTENUATION AND/OR CLADDING MODES," which is a 371 national stage of PCT Application No. PCT/GB2018/051830, filed on Jun. 29, 2018 and entitled "APPARATUS FOR MONITORING THE OUTPUT OF AN OPTICAL SYSTEM," which claims priority to United Kingdom Patent Application No. 1710522.2, filed on Jun. 30, 2017 and entitled "SPATIAL FILTER," the contents of each of which are incorporated by reference herein.

FIELD OF THE INVENTION

The present invention relates to optical systems. In particular, the invention relates to an apparatus for monitoring the output of an optical system.

BACKGROUND

Control systems for optical apparatus require the monitoring of outputs. For example, a phase modulated system requires precise control of a modulator such as a Mach-Zehnder (MZ) modulator, which is achieved by a feedback loop. This feedback loop includes a detector which monitors a beam split from the output beam. The intensity of this beam is used to determine whether the modulator is selecting the correct phase, and to control the phase if it is not.

An exemplary diagram of such a system is shown in FIG. 1 (dotted lines represent light paths). A MZ modulator 1 has an output which is directed to a beam splitter 2. The two outputs from the beam splitter go to the system output 3 (typically a lens which focusses the beam on to a fibre-optic) and to the detector 4.

It has been found that the accuracy of such systems is limited to about 1 degree of phase angle. For high speed phase modulated transmitters, greater accuracy of phase control is required.

SUMMARY

According to a first aspect of the present invention, there is provided an apparatus for monitoring the output of an optical system. The apparatus comprises first and second fibre optic sections, a reflective coating, and a detector. The first fibre optic section has a first cladding and a first core, and is configured to receive light from the optical system at one end and has at the other end a first angled, polished face. The second fibre optic section has a second cladding and a second core, and has at one end a second angled, polished face. The first and second fibre optic sections are arranged such that the first and second angled, polished faces are substantially parallel and adjacent and the first and second cores are substantially aligned. The reflective coating is applied to the first or second angled, polished face, and is configured to reflect a portion of light transmitted through the first core. The detector is arranged to receive the reflected light.

According to a second aspect of the present invention, there is provided an apparatus for monitoring the output of an optical system. The apparatus comprises a beam splitter, a lens, a fibre optic stub having a core and a cladding, and a detector. The beam splitter is configured to receive light from the output of the optical system and has first and second outputs, the first output being configured to pass light to a fibre optic cable. The lens is configured to focus light from the second output of the beam splitter into the core of the fibre-optic stub. The detector configured to receive light from the fibre optic stub.

According to a third aspect of the present invention, there is provided an optical modulator assembly. The assembly comprises an optical modulator, an apparatus according to either the first or second aspect, and a feedback system. The apparatus according to the first or second aspect is configured to monitor an output of the modulator. The feedback system is configured to control the interferometer on the basis of the monitored output.

The modulator and the apparatus may be co-located on a single chip.

According to a fourth aspect, there is provided an optical system. The optical system comprises an optical component; an apparatus according to the first or second aspect configured to monitor an output of the component; a variable optical amplifier for controlling the intensity of light downstream of the apparatus; and a further apparatus according to the first or second aspect located downstream of the variable optical amplifier.

Further embodiments of the invention are presented in claim 2 et seq.

BRIEF DESCRIPTION OF THE DRAWINGS

FIG. 1 is a schematic diagram of a modulator system;

FIG. 2 is a schematic diagram of an exemplary modulator system;

FIG. 3 is a graph of attenuation against fibre length for an unwanted mode;

DETAILED DESCRIPTION

Figure 4:
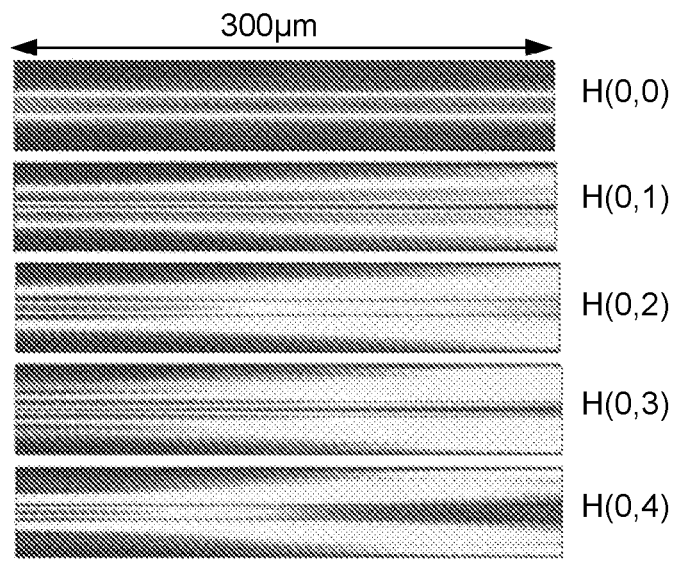
FIG. 4 shown the intensity of various modes transmitted through a short length of fibre.

The inaccuracy of output monitoring in phase control systems comes about because components such as a Mach Zehnder modulator do not necessarily produce a signal with only the desired characteristics. As well as the signal at the "fundamental" mode (denoted as [0,0]), there are signals produced at higher order modes (denoted as [x,y], where x>0, y>0). These superfluous signals are attenuated within the output optical fibre, and so are negligible at whichever device is receiving the signal. However, because the detector for the phase control receives a signal directly from the MZ modulator (or other component near the output of the optical system), there is no opportunity for the higher order modes to be attenuated.

This could be resolved by using a fibre tap in the output fibre to divert a signal to the detector. However, fibre taps are relatively bulky (a few cm long), and it would be advantageous to have a solution which can be encapsulated on the same chip as the modulator.

In order to fit on the chip, any solution must be on the order of a few millimetres long, e.g. less than 10 mm, more preferably less than 5 mm. One approach to address this is shown in FIG. 2, which is a schematic illustration of an optical component 21 directing light into a beam splitter 22 and hence to an optical output 23 and detector 24, in the same way as the system shown in FIG. 1. In the arrangement of FIG. 2, a short fibre "stub" 25 is provided between the beam splitter 22 and the detector 24. The monitoring output of the beamsplitter 22 is focused by a lens 26 into the fibre stub 25. Light passes through the fibre stub to the detector 24. As the light passes through the fibre stub 25, the higher order modes are attenuated, so the only light reaching the detector 24 is the fundamental.

The length of the fibre stub 25 should be chosen to ensure that sufficient attenuation of the higher order modes takes place before the light reaches the detector 24. FIG. 3 shows the attenuation of the mode [1,1] against the length of fibre in an example. As can be seen, an attenuation of greater than −15 dB/mm can be achieved. Higher order modes will tend to attenuate even more sharply, as shown in FIG. 4, which shows the intensity of H(0,0) to H(0,4) order modes through a 300 micron length of fibre (dark reds are high intensity, dark blues are low intensity). This means that sufficient attenuation of higher order modes can be achieved with a fibre stub only a few millimetres long.

Figure 6:
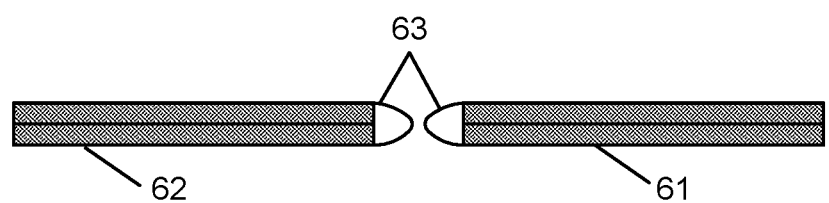
FIG. 6 is a schematic diagram of an exemplary fibre stub.

As well as the higher order modes, errors in the signal will also come from "cladding modes". These modes result from signals (at both the fundamental and higher order modes) which are not correctly focused into the core when the light is directed into the fibre optic. Such signals travel through the cladding, and can reach the end of a short length of fibre optic before being attenuated (either directly, or via a reflection off the outer surface of the cladding). The system can be improved still further if these cladding modes are prevented from reaching the detector. This is possible within the fibre stub already described using one or more of the techniques described below:

- the fibre optic may be bent so there is no direct optical path between input and output. This reduces the number of possible angles at which cladding modes can enter the stub and be transmitted to the detector. Very small radius bends can also attenuate the fundamental mode in the core, but radii sufficient to cause a small attenuation in the fundamental mode in the core (e.g. 0 to −0.5 dB, more preferably 0 to −0.05 db) can still cause a significant reduction in the cladding modes. Suitable bend radiuses are 2 mm to 20 mm. For example, a 12 mm bend radius in an exemplary 3 mm length fibre stub may cause a −38 dB attenuation in the cladding mode, but only a −0.036 dB attenuation in the fundamental mode in the core.
- an absorber may be applied to the outer surface of the cladding or to a break in the cladding, causing the cladding modes to be absorbed rather than reflected at the edge of the cladding. Provided that the absorber is substantially beyond the evanescent field of the fundamental mode in the core (e.g. more than 10 microns from the core), it will not have any significant effect on the fundamental mode.
- The absorber may be placed beyond the outer surface of the cladding, with a further material, index matched to the cladding, located between the absorber and cladding. Alternatively the absorber itself may be a material which is index matched to the cladding. The absorber may absorb at least 90%, or at least 95%, of incident light.
- As shown in FIG. 6, the fibre stub may comprise two lens-ended fibres 61, 62 (i.e. fibres where the end of the fibre is formed into a lens 63), with their cores aligned such that the lenses face each other and have a common focus. This will allow light to couple between the cores of the two lens-ended fibres, but cladding modes will not be able to pass from one lens-ended fibre to the other.

While the provision of a separate fibre stub improves the accuracy of phase detection, there may still be some variation between the signal at the detector and the signal at the output. This arises because the modes propagated by the fibre stub are not guaranteed to be the same as those propagated by the output optical fibre. This can be mitigated by making the first section of the optical fibre as structurally similar as possible to the fibre stub (e.g. same bending radius, same layers outside the cladding).

Another way to ensure that the signal at the detector and the output signal have had the same attenuation of higher order and cladding modes is to provide a system in which the detector signal and output signal both pass through the same section of fibre. The conventional way to achieve this would be to provide a fibre tap—but as noted previously, fibre taps are relatively bulky and would not fit within the package of many optical systems. In order to allow detection of the signal within the fibre, a new fibre configuration will now be described. While this is presented in the context of diverting a signal for use in phase detection, it will be appreciated that this fibre configuration can be used in other circumstances where a signal must be sampled or split from a fibre (e.g. where a fibre tap would otherwise be used).

Figure 5A:
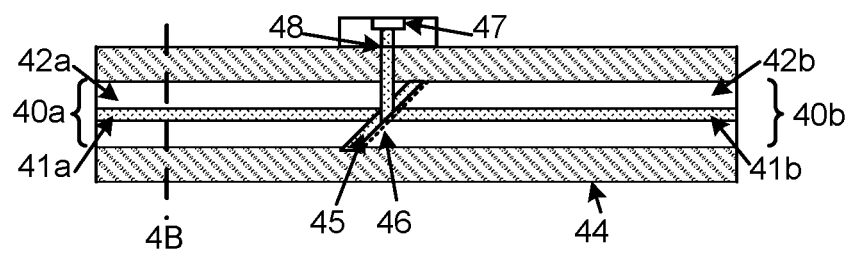
FIGS. 5A and 5B are cross sections of an exemplary construction.
Figure 5B:
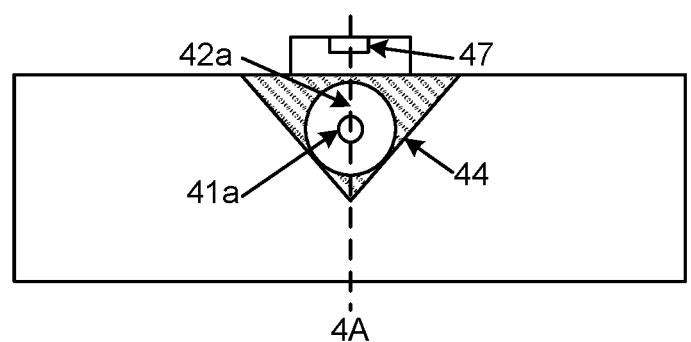

The new configuration is shown in FIG. 5A (side cross section) and 5B (front cross section). A fibre 40a, 40b comprises a core 41a, 41b and a cladding 42a, 42b. The fibre 40a,b is located in a v-groove 43 (or other alignment means) and held in place using resin 44. The resin 44 may be index matched to the cladding 42a,b and/or contain absorbers to reduce cladding modes as described previously for the fibre stub 25. The fibre is split into two sections, 40a and 40b, which each have an angled, polished face. The fibre sections are located such that the angled, polished faces are at substantially the same angle and in proximity to each other. The angled polished faces may have an angle of between 40 and 50 degrees, more particularly 45 degrees. A layer 45 of material with a refractive index similar to the core and the cladding, or index matches to the core, is used to connect the angled, polished faces, which will mitigate any minor variations in angle and position. The angled, polished face of the first section 40a is provided with a reflective coating 46, which is configured to reflect a proportion of the light passing through the fibre, e.g. less than 10%, 5%, less than 5%, and/or at least 2%.

The reflected light travels to a detector 47 (or other output) through a region 48. The region 48 may comprise material that is index matched to the cladding 41a, 41b. The detector 47 can be placed sufficiently close to the fibre that no lens is required to focus the light onto the detector.

All of the techniques outlined above for the fibre stub may be applied to the fibre optic cable section preceding the detector. For example, the cable may be bent or absorbing material added around the cladding to attenuate cladding modes.

The configuration shown in FIG. 5A can be conveniently incorporated into existing fibre-optic structures. For example, where an optical apparatus includes a VOA (variable optic attenuator), the fibre optic both before and after the VOA may incorporate detectors according to FIG. 5A, which provides a compact solution to pre- and post-VOA detection. The VOA may be mounted within the same v-groove as the fibre optic sections of the detectors. Alternatively, only one of the pre- and post-VOA monitors may be made with that configuration.

The invention claimed is:

1. An apparatus comprising:
   a beam splitter;
   a lens;
   a fibre optic stub having a core, a cladding, and a cladding mode reduction feature; and
   a detector,
      wherein the fibre optic stub is less than 10 millimeters (mm) in length from a first end proximate to the lens and a second end proximate to the detector,
      wherein the lens is arranged to focus light from an output of the beam splitter into the core,
      wherein the cladding mode reduction feature comprises at least one of:
         a bend in the fibre optic stub,
            wherein the bend has a radius between 2 mm and 20 mm,
         an absorber applied to the cladding,
            wherein the absorber comprises an index matched material which is index matched to the cladding, or
         two lens-ended fibres included in the fibre optic stub,
            wherein the two lens-ended fibres are aligned such that lenses of the two lens-ended fibres face each other and have a common focus;
      wherein the detector is arranged to receive light from the fibre optic stub, and
      wherein the apparatus is co-located on a single chip with an optical modulator.

2. The apparatus of claim 1, wherein the cladding mode reduction feature comprises the bend.

3. The apparatus of claim 1, wherein the cladding mode reduction feature comprises the absorber.

4. The apparatus of claim 1, wherein the cladding mode reduction feature comprises the absorber, and wherein the absorber is applied to a break in the cladding and located at least 10 microns from the core.

5. The apparatus of claim 1, wherein the cladding mode reduction feature comprises the two lens-ended fibres.

6. The apparatus of claim 1, further comprising:
   an optical device to provide the light; and
   a section of optical fibre between the optical device and the beam splitter,
      wherein the section of optical fibre comprises another cladding mode reduction feature that corresponds to the cladding mode reduction feature.

7. The apparatus of claim 1, wherein the fibre optic stub is configured to attenuate higher order modes of light by greater than −15 dB/millimeter.

8. An apparatus, co-located on a single chip with an optical modulator, comprising:
   a beam splitter;
   a lens;
   a fibre optic stub having a core, a cladding, and a cladding mode reduction feature; and
   a detector,
      wherein the fibre optic stub is less than 10 millimeters (mm) in length from a first end proximate to the lens and a second end proximate to the detector,
      wherein the beam splitter is arranged to receive light from the optical modulator,
      wherein the lens is arranged to focus light from an output of the beam splitter into the core,
      wherein the cladding mode reduction feature comprises at least one of:
         a bend in the fibre optic stub,
            wherein the bend has a radius between 2 mm and 20 mm,
         an absorber applied to the cladding,
            wherein the absorber comprises an index matched material which is index matched to the cladding, or
         two lens-ended fibres included in the fibre optic stub,
            wherein the two lens-ended fibres are aligned such that lenses of the two lens-ended fibres face each other and have a common focus; and
      wherein the detector is arranged to receive light from the fibre optic stub.

9. The apparatus of claim 8, wherein the cladding mode reduction feature comprises the bend.

10. The apparatus of claim 8, wherein the cladding mode reduction feature comprises the absorber.

11. The apparatus of claim 8, wherein the cladding mode reduction feature comprises the absorber, and wherein the absorber is applied to a break in the cladding and located at least 10 microns from the core.

12. The apparatus of claim 8, wherein the cladding mode reduction feature comprises the two lens-ended fibres.

13. The apparatus of claim 8, further comprising:
   a section of optical fibre between the optical modulator and the beam splitter,
      wherein the section of optical fibre comprises another cladding mode reduction feature that corresponds to the cladding mode reduction feature.

14. An optical modulator assembly, comprising:
   an optical modulator; and
   an apparatus, comprising:
   a beam splitter;
   a lens;
   a fibre optic stub having a core, a cladding, and a cladding mode reduction feature; and
   a detector,
      wherein the fibre optic stub is less than 10 millimeters (mm) in length from a first end proximate to the lens and a second end proximate to the detector,
      wherein the beam splitter is arranged to receive light from the optical modulator,
      wherein the lens is arranged to focus light from an output of the beam splitter into the core,
      wherein the cladding mode reduction feature comprises at least one of:
         a bend in the fibre optic stub,
            wherein the bend has a radius between 2 mm and 20 mm,
         an absorber applied to the cladding,
            wherein the absorber comprises an index matched material which is index matched to the cladding, or
         two lens-ended fibres included in the fibre optic stub,
            wherein the two lens-ended fibres are aligned such that lenses of the two lens-ended fibres face each other and have a common focus;
      wherein the detector is arranged to receive light from the fibre optic stub, and
      wherein the apparatus is co-located on a single chip with the optical modulator.

15. The optical modulator assembly of claim 14, wherein the cladding mode reduction feature comprises the bend.

16. The optical modulator assembly of claim 14, wherein the cladding mode reduction feature comprises the absorber, and wherein the absorber comprises
   a material applied to a break in the cladding and located at least 10 microns from the core.

17. The optical modulator assembly of claim 14, wherein the cladding mode reduction feature comprises the two lens-ended fibres.

18. The optical modulator assembly of claim 14, wherein the beam splitter is arranged to split light and direct a first portion of the light in a first direction toward the lens and a second portion of the light in a second direction.

19. The apparatus of claim 1, wherein the beam splitter is arranged to split light and direct a first portion of the light in a first direction toward the lens and a second portion of the light in a second direction.

20. The apparatus of claim 8, wherein the beam splitter is arranged to split light and direct a first portion of the light in a first direction toward the lens and a second portion of the light in a second direction.

* * * * *